United States Patent

[11] 3,622,452

| [72] | Inventors | Katsunobu Tanaka<br>Machida-shi;<br>Kazuo Ohshima, Tokyo; Yoh Tokoru,<br>Tokyo, all of Japan |
|---|---|---|
| [21] | Appl. No. | 705,015 |
| [22] | Filed | Feb. 13, 1968 |
| [45] | Patented | Nov. 23, 1971 |
| [73] | Assignee | Kyowa Hakko Kogyo Co., Ltd.<br>Tokyo, Japan |
| [32] | Priority | Feb. 14, 1967 |
| [33] | | Japan |
| [31] | | 42/8987 |

[54] PROCESS FOR PRODUCING INOSINE BY FERMENTATION
5 Claims, No Drawings

| [52] | U.S. Cl. | 195/28 N |
|---|---|---|
| [51] | Int. Cl. | C12d 13/06 |
| [50] | Field of Search | 195/28 N |

[56] References Cited
UNITED STATES PATENTS

| 3,111,459 | 11/1963 | Motozaki et al. | 195/28 N |
|---|---|---|---|
| 3,222,258 | 12/1965 | Iizuka et al. | 195/3 H |
| 3,308,035 | 3/1967 | Dours, Jr. | 195/28 |
| 3,355,296 | 11/1967 | Perkins et al. | 195/3 H |
| 3,410,753 | 11/1968 | Demain et al. | 195/28 N |

OTHER REFERENCES

Iguchi et al., Agr. Biol. Chem. Vol. 30 Page 709 (1966) Vol. 31 Pages 569–577 (1967)

*Primary Examiner*—Alvin E. Tanenholtz
*Attorney*—Craig, Antonelli, Stewart & Hill ABSTRACT: A process for producing inosine by fermentation which comprises culturing a hydrocarbon-assimilating microorganism capable of producing inosine under aerobic conditions in an aqueous nutrient medium containing at least one hydrocarbon as the main carbon source. Exemplary micro-organisms which may be employed include *Brevibacterium ketoglutamicum*, *Arthrobacter paraffineus*, and *Corynebacterium hydrocarboclastus*.

PROCESS FOR PRODUCING INOSINE BY FERMENTATION

This invention relates to a process for producing inosine. More particularly, it relates to a process for the production of inosine by fermentation. Even more particularly, the invention relates to a process for the production of inosine from hydrocarbons on an industrial scale.

Inosine is a compound well known in the art which has a number of uses. It is found in meat and meat extracts and in sugar beets. Accordingly, an effective industrial scale process for the production of inosine would be highly desirable.

One of the objects of the present invention is to provide an improved process for the production of inosine.

Another object of the present invention is to provide a process for producing inosine by fermentation which may be carried out in an efficacious and simple manner.

A further object of the invention is to provide a process for producing inosine by fermentation which may be carried out advantageously on an industrial scale at low cost from inexpensive starting materials to give a high yield of product.

A still further object of the invention is to provide inosine.

These and other objects and advantage of the present invention will become apparent to those skilled in the art from a consideration of the following specification and claims.

In accordance with the present invention, it has been found that remarkably large quantities of inosine may be accumulated in the fermentation liquor by culturing mutants having the nutritional requirement of hydrocarbon-assimilatory bacteria in an aqueous nutrient medium containing hydrocarbons as the main carbon source. The resultant inosine may then be recovered from the culture liquor.

As for the strains to be employed in the present invention, the scope of the present invention is not particularly limited and all hydrocarbon-assimilatory micro-organisms capable of producing inosine may be used. Exemplary bacteria which may be employed include *Brevibacterium ketoglutamicum*, *Arthrobacter paraffineus* and *Corynebacterium hydrocarboclastus*.

Thus, significant amounts of inosine are accumulated by culturing hydrocarbon-assimilatory strains in a culture medium comprising hydrocarbons as the main carbon source, inorganic and/or organic sources of nitrogen, inorganic compounds and other nutrient sources in appropriate amounts. Hypoxanthine is sometimes subsidiarily accumulated at the same time.

Either a synthetic culture medium or a natural nutrient medium is suitable in the present invention as long as it contains the essential nutrients for the growth of the strain employed. As noted above, these include substances such as a carbon source, a nitrogen source, inorganic compounds and the like which are utilized by the micro-organism employed in appropriate amounts. The characterizing feature of the present invention is the use of hydrocarbons as the main carbon source. Exemplary thereof include the use of a single or a mixture of more than one aliphatic hydrocarbon containing from 10 to 25 carbon atoms or crude hydrocarbon materials such as kerosene, light oils and the like. The preferred hydrocarbons to be employed, resulting in the accumulation of significant quantities of inosine in the culture liquor, are n-paraffins having from 12 to 18 carbon atoms, either in mixture or as single individual sources of carbon.

As a nitrogen source, various kinds of inorganic or organic salts or compounds, such as urea or ammonium salts such as ammonium nitrate, ammonium chloride, ammonium sulfate, ammonium acetate, ammonium phosphate, ammonium carbonate, etc., or natural substances containing nitrogen, such as cornsteep liquor, yeast extract, meat extract, peptone, fish meal, bouillon, casein hydrolysates, fish solubles, rice bran extract, etc. may be employed. These substances may be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, sodium chloride, etc.

As is conventional in the art, growth-promoting agents such as biotin or vitamins should also be added to the medium, if required. In the case of a purely synthesized culture medium, appropriate amounts of thiamine and adenine are added thereto.

Although hydrocarbons are used as the main source of carbon in the nutrient medium in accordance with the present invention, it is to be understood that small amounts of other sources of carbon may also be employed therein, if desired. These include, for example, carbohydrates such as glucose, fructose, maltose, sucrose, starch, starch hydrolysate, molasses, etc. or any other suitable carbon source such as glycerol, mannitol, sorbitol, organic acids, etc. These substances, although used in minor amounts, if desired, may be employed either singly or in mixtures of two or more.

The cultivation or fermentation employed herein to obtain inosine is conducted under aerobic conditions, such as aerobic shaking of the culture or with aeration and agitation of a submerged culture, at a temperature of about 25° to 42° C. and at a pH of about 6 to 8. After about 4 to 6 days of culturing under these conditions, significant amounts of inosine are found to be accumulated in the culture liquor. As noted above, hypoxanthine is sometimes simultaneously accumulated therewith.

After the completion of fermentation, the inosine may be separated from the culture liquor by conventional means, such as ion exchange resin treatment, extraction with solvents, precipitation with metallic salts, adsorption, chromatography or the like.

The following examples are given merely as illustrative of the present invention and are not to be considered as limiting. Unless otherwise noted, the percentages therein and throughout the application are by weight per liter of water.

EXAMPLE 1

The mutant strain *Brevibacterium ketoglutamicum* No. 2473–N–14ATCC 21169 (an adenine-requiring strain) is used as the seed bacterium. It is cultured in a yeast-bouillon medium (adjusted to a pH of 7.0) at 37° C. for 24 hours with aerobic shaking. The thus obtained seed culture liquor is inoculated in the ratio of 10 percent (by volume) into a fermentation medium having the following composition:

5% n-paraffin mixture ($C_{12}$–$C_{14}$)
1% $NH_4NO_3$
0.2% $KH_2PO_4$
0.2% $Na_2HPO_4$
0.1% $MgSO_4 \cdot 7H_2O$
0.005% $MnSO_4 \cdot 4H_2O$
0.001% $FeSO_4 \cdot 7H_2O$
0.001% $ZnSO_4 \cdot 7H_2O$
0.5% yeast extract
0.2% cornsteep liquor
0.005% adenine
2% calcium carbonate The pH of this medium is 6.8.

Twenty ml. portions of the mixture of both media are poured into 250 ml. Erlenmeyer flasks, respectively, and sterilized before use. Culturing is then carried out with aerobic shaking at 37° C.

After 5 days of culturing under these conditions, 1.5 mg./ml. of inosine is accumulated in the fermentation liquor. Also simultaneously accumulated therein is 0.7 mg./ml. of hypoxanthine.

EXAMPLE 2

The mutant strain *Arthrobacter paraffineus* No. 2411–U–20 ATCC 21161 (an adenine-requiring strain) is used as the seed bacterium. It is cultured in a yeast-bouillon medium containing an n-paraffin mixture at 30° C. for 24 hours. The thus-obtained seed culture liquor is inoculated in the ratio of 10 percent (by volume) according to the same manner as described in example 1 into a fermentation medium having the following composition:

10% n-paraffin mixture ($C_{12}$–$C_{14}$)
2% $(NH_4)_2SO_4$
0.2% $KH_2PO_4$
0.2% $Na_2HPO_4$
0.1% $MgSO_4 \cdot 7H_2O$
0.001% $MnSO_4 \cdot 4H_2O$
0.001% $FeSO_4 \cdot 7H_2O$
0.3% cornsteep liquor
0.5% yeast extract
2 mg./l. thiamine
0.005% adenine
2% calcium carbonate The pH of this medium is 6.8. Culturing of 20 ml. portions of the mixture of media is carried out with aerobic shaking at 30° C. After 6 days of culturing under these conditions, 2.8 mg./ml. of inosine is accumulated in the fermentation liquor.

EXAMPLE 3

The mutant strain *Corynebacterium hydrocarboclastus* No. 2438–N–17 ATCC 21162 (an adenine-requiring strain) is used as the seed bacterium. The same procedure as described in example 1 is carried out in media having the same composition, except that 5 percent of light oil is used instead of the n-paraffin mixture in the fermentation medium.

After culturing for 6 days under the conditions described in example 1, the amount of inosine found to be accumulated in the culture liquor is 1 mg./ml.

While specific examples have been shown hereinabove, it is to be understood that a wide range of hydrocarbons may be employed in the process of the present invention. These include, in addition to the hydrocarbons enumerated above, cycloparaffins, olefins, cycloolefins, benzene, lower-alkyl substituted benzenes and crudes such as light or heavy oils.

The invention being thus described, it will be obvious that the same way be varied in many ways. Such variations are not to be regarded as a departure from the spirit and scope of the invention, and all such modifications are intended to be included within the scope of the following claims.

We claim:

1. A process for producing inosine by fermentation which comprises culturing *Arthrobacter paraffineus* ATCC 21161 under aerobic conditions in an aqueous nutrient medium containing at least one hydrocarbon as the main carbon source, accumulating inosine in the resultant culture liquor, and recovering the inosine therefrom.

2. The process of claim 1, wherein said hydrocarbon is an aliphatic hydrocarbon having from 10 to 25 carbon atoms.

3. The process of claim 1, wherein said hydrocarbon is an n-paraffin of 12 to 18 carbon atoms.

4. The process of claim 1, wherein said hydrocarbon is a crude hydrocarbon material selected from the group consisting of kerosene, light oils and heavy oils.

5. The process of claim 1, wherein culturing is carried out at a temperature of about 25° to 42° C. and at a pH of about 6 to 8.

* * * * *

UNITED STATES PATENT OFFICE
CERTIFICATE OF CORRECTION

Patent No. 3,622,452      Dated November 23, 1971

Inventor(s) Katsunobu Tanaka, Kazuo Ohshima and Yoh Tokoro

It is certified that error appears in the above-identified patent and that said Letters Patent are hereby corrected as shown below:

Title Page, left column, line 3, which now reads:

"Kazuo Ohshima, Tokyo; Yoh Tokoru"

should read as follows:

--Kazuo Ohshima, Tokyo; Yoh Tokoro--

Signed and sealed this 23rd day of May 1972.

(SEAL)
Attest:

EDWARD M. FLETCHER, JR.
Attesting Officer

ROBERT GOTTSCHALK
Commissioner of Patents